United States Patent
Pasquino et al.

[15] 3,697,578
[45] Oct. 10, 1972

[54] PROCESS FOR PREPARING 3-PENTENE NITRILE

[72] Inventors: Pietro Pasquino, Vercelli; Luigi Benzoni, Novara; Giuseppe Carnisio, Galliate; Luigi Colombo, Arona, all of Italy

[73] Assignee: Montecatini Edison S.p.A., Milan, Italy

[22] Filed: Dec. 16, 1970

[21] Appl. No.: 98,908

[30] Foreign Application Priority Data

Dec. 17, 1969 Italy...................25901 A/69

[52] U.S. Cl..............................................260/465.9
[51] Int. Cl.............................................C07c 121/30
[58] Field of Search..................................260/465.9

[56] References Cited

UNITED STATES PATENTS

| | | |
|---|---|---|
| 3,537,748 | 10/1970 | Drinkard, Jr. et al. .260/465.9 |
| 3,496,218 | 2/1970 | Drinkard, Jr. et al..260/465.3 X |
| 3,542,847 | 11/1970 | Drinkard, Jr. et al. .260/465.9 |
| 3,551,474 | 12/1970 | Drinkard, Jr. et al. .260/465.9 |
| 3,564,040 | 2/1971 | Downing et al.....260/465.3 X |
| 3,579,560 | 5/1971 | Drinkard, Jr. et al. .260/465.9 |

*Primary Examiner*—Joseph P. Brust
*Attorney*—Patricia Q. Peake and Stevens, Davis, Miller & Mosher

[57] ABSTRACT

3-pentene-nitrile is prepared by isomerization of 2-methyl-3-butene-nitrile, using a nickel complex as catalyst.

3 Claims, No Drawings

PROCESS FOR PREPARING 3-PENTENE NITRILE

According to the invention, the isomerization of the 2-methyl-3-butene-nitrile is accomplished by heating it at a temperature of from 50° C to 150° C, in absence of a solvent, at normal pressure, for a time period ranging from 15 to 150 minutes, and in the presence of a catalyst consisting of a phosphinic complex of nickel.

The 2-methyl-3-butene-nitrile used as starting material may be obtained, for example, as by-product of the reaction between hydrocyanic acid and butadiene, for the preparation of linear, unsaturated nitriles.

The unsaturated nitriles are useful as intermediates in the preparation of amines, dinitriles, and acids. Thus, 3-pentene-nitrile may be transformed, by the addition of HCN, into adiponitrile which is a useful intermediate in the production of nylon.

The nickel complexes used as catalysts in the process of the invention correspond to the following formula

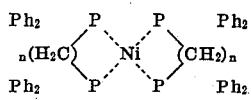

where Ph represents the phenyl group and $n$ represents a whole number and is 3, 4 or 5.

Phosphinic nickel complexes comprised within the formula include $n=3$ Ni[Ph$_2$P-(CH$_2$)$_3$ - PPh$_2$]$_2$, which is di[1,3-bis(diphenylphosphine)-propane]nickel, and hereinafter indicated as Ni(dp-pr)$_2$;

$n=4$ Ni[Ph$_2$P-(CH$_2$)$_4$ -PPh$_2$]$_2$, which is di[1,4-bis(diphenylphosphine)-butane]nickel and hereinafter indicated as Ni(dp-bu)$_2$;

$n=5$ Ni[Ph$_2$P-(CH$_2$)$_5$ -PPh$_2$]$_2$, which is di[1,5-bis(diphenylphosphine)-pentane]nickel and hereinafter indicated as Ni(dp-pe)$_2$.

These phosphinic complexes of nickel may be prepared by the process described in Inorganic Chem. 5, 1966–1968, by C.R. Van Hecke and W. Horrocks.

The isomerization of the 2-methyl-3-butene-nitrile proceeds as follows:

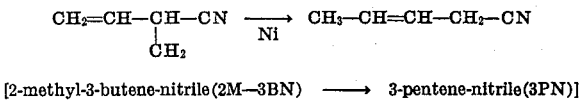

[2-methyl-3-butene-nitrile(2M—3BN) ⟶ 3-pentene-nitrile(3PN)]

and as already mentioned is effected in the absence of a solvent, at normal pressure, and at temperatures between 50° C and 150° C, using the catalysts described herein.

Preferably, the mixture is refluxed for a period of time ranging from 15 minutes to 150 minutes.

The molar ratio between the nickel complex and 2-methyl-3-butene-nitrile is from 1:100 to 1:1,000.

After the reaction has been completed, the crude reaction product, separated from the catalyst, can be recovered by known methods, such as by distillation and chromatography in vapor phase.

The following examples are given to illustrate the invention and are not intended to be limiting.

EXAMPLE 1

0.49 g (0.54 mM) of Ni(dp-bu)$_2$, and
10 g (120 mM) of 2M-3BN
were introduced into a cc glass reactor, under an inert gas atmosphere.

The mixture was reflux heated under stirring for 1½ hours, during which time the temperature rose from 128° to 138° C. The mixture was then cooled and discharged.

The crude reaction product, separated from the catalyst, and analyzed by gas-chromatographic analysis, contained:

71.4 percent of cis and trans 3-pentene-nitrile
12.0 percent of cis 2-methyl-2-butene-nitrile
11.0 percent of trans 2-methyl-2-butene-nitrile The remaining mixture consisted of unreacted 2-methyl-3-butene-nitrile and of cis and trans 2-pentene-nitrile.

EXAMPLE 2

0.25 g (0.28 mM) of Ni(dp-bu)$_2$, and
10 g (120 mM) of 2M-3BN
were introduced into a 50 cc glass reactor, under an inert gas atmosphere.

The mixture was reflux heated under stirring for 1½ hours at a temperature comprised between 128° and 140° C, then cooled and discharged.

The crude reaction product, separated from the catalyst, and analyzed by gas-chromatography, contained:

74.25 percent of cis and trans 3-pentene-nitrile
11.77 percent of cis 2-methyl-2-butene-nitrile
7.6 percent of trans 2-methyl-2-butene-nitrile

EXAMPLE 3

0.1 g (0.11 mM) of Ni(dp-bu)$_2$, and
10 g (120 mM) of 2M-3BN
were introduced into a 50 cc glass reactor, under an inert gas atmosphere.

The mixture was reflux heated under stirring for 2 hours at a temperature ranging from 128° to 138° C, after which it was cooled and discharged.

The crude liquid product, separated from the catalyst and analyzed by gas-chromatography, was found to contain:

69.59 percent of 3-pentene-nitrile
13.67 percent of cis 2-methyl-2-butene-nitrile
9.56 percent of trans 2-methyl-2-butene-nitrile The remaining liquid consisted of unreacted 2-methyl-3-butenenitrile and of cis and trans 2-pentene-nitrile.

EXAMPLE 4

0.25 g (0.28 mM) of Ni(dp-bu)$_2$, and
10 g (120 mM) of 2M-3BN
were introduced into a 50 cc glass reactor, under an inert gas atmosphere.

The mixture was reflux heated under stirring for 1 hour at a temperature ranging from 128° to 139° C, and then cooled and discharged.

The crude reaction mixture, separated from the catalyst, and analyzed by gas-chromatography, was found to contain:

75.21 percent of 3-pentene-nitrile
11.02 percent of cis 2-methyl-2-butene-nitrile
7.08 percent of trans 2-methyl-2-butene-nitrile.

EXAMPLE 5

0.20 g (0.22 mM) of Ni(dp-pr)$_2$, and 10 g (120 mM) of 2M-3BN
were introduced into a 50 cc glass reactor, under an inert gas atmosphere.

The mixture was reflux heated under stirring for 1 ½ hours at a temperature comprised between 128° to 139.5° C, then cooled and discharged.

The crude liquid product, separated from the catalyst and analyzed by gas-chromatography, contained:

73.23 percent of 3-pentene-nitrile
9.02 percent of cis 2-methyl-2-butene-nitrile
10.68 percent of trans 2-methyl-2-butene-nitrile.

The remaining liquid consisted of unconverted 2-methyl-3-butene-nitrile and of cis and trans 2-pentene-nitrile.

EXAMPLE 6

0.20 g (0.21 mM) of Ni(dp-pe)₂, and
10 g (120 mM) of 2M-3BN
were introduced into a 50 cc glass reactor, under an inert gas atmosphere.

The mixture was reflux heated under stirring for 2 hours at a temperature comprised between 128° and 132° C, then cooled and discharged.

The crude liquid product, separated from the catalyst and analyzed by gas-chromatography, contained:

39.72 percent of 3-pentene-nitrile
6.69 percent of cis 2-methyl-2-butene-nitrile
25.82 percent of trans 2-methyl-2-butene-nitrile.

The remaining liquid consisted of unconverted 2-methyl-3-butene-nitrile.

EXAMPLE 7

0.27 g (0.29 mM) of Ni(dp-bu)₂, and
10 g (120 mM) of 2M-3BN
were introduced into a 50 cc glass reactor, under an inert gas atmosphere.

It was heated under stirring for 1 hour and 45 minutes, keeping the temperature constant at 128° C, then cooled and discharged.

The crude reaction product, separated from the catalyst and analyzed by gas-chromatography, contained:

79.5 percent of cis and trans 3-pentene-nitrile
8.78 percent of cis 2-methyl-2-butene-nitrile
6.24 percent of trans 2-methyl-2-butene-nitrile.

The remaining mixture consisted of unreacted 2-methyl-3-butene-nitrile and of cis and trans 2-pentene-nitrile.

It will be apparent that changes in details may be made in practicing the invention, without departing from its spirit. Therefore, we intend to include, in the scope of the appended claims, all such modifications as will be obvious to those skilled in the art from the description and working examples given herein.

We claim:

1. A process for preparing 3-pentenenitrile by isomerization of 2-methyl-3-butene-nitrile, characterized in that the isomerization reaction is carried out in the absence of solvent, at normal pressure, at a temperature of from 50° C to 150° C, for a period of time of from 15 minutes to 150 minutes, and in the presence of a catalyst consisting of a nickel complex having the general formula

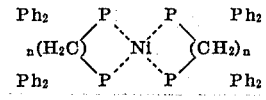

wherein Ph represents the phenyl group and $n$ represents a whole number and is 3 or 4, and being further characterized in that the molar ratio between the nickel complex and the 2-methyl-3-butene-nitrile is from 1:100 to 1:1,000.

2. The process according to claim 1, further characterized in that the catalyst is di[1,3-bis(diphenylphosphine)-propane] nickel.

3. The process according to claim 1, further characterized in that the catalyst is di[1,4-bis(diphenylphosphine)-butane] nickel.

* * * * *